H. D. MORGAN

ARTIFICIAL DENTURE AND METHOD OF MAKING THE SAME

Dec. 29, 1931. Re. 18,311

Original Filed March 28, 1927

INVENTOR

Hugh D. Morgan by his attorneys

Byrnes, Stebbins & Parmelee

Reissued Dec. 29, 1931

Re. 18,311

UNITED STATES PATENT OFFICE

HUGH D. MORGAN, OF YOUNGSTOWN, OHIO

ARTIFICIAL DENTURE AND METHOD OF MAKING THE SAME

Original No. 1,714,185, dated May 21, 1929, Serial No. 178,949, filed March 28, 1927. Application for reissue filed April 15, 1930. Serial No. 444,586.

This invention relates to artificial dentures and method of making the same, and more particularly to a denture adapted to be firmly held in place by reason of a partial vacuum between the denture and the gum. The invention further relates to an improved apparatus whereby a vacuum seal is maintained between the gum and the plate.

I provide an artificial denture having a channel therein adapted to receive a rib of soft rubber or other suitable material, the rib being provided with divergent flaps which engage the gum and form a vacuum seal. By reason of the large area exposed to differential air pressure, the teeth are firmly held in place.

In the accompanyling drawings illustrating the present preferred embodiment of my invention:

Figure 1:
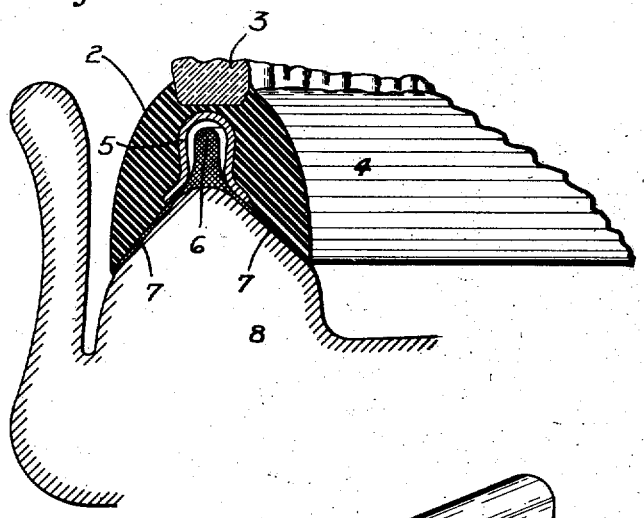
Figure 1 is a sectional view, to greatly enlarged scale, showing my improved denture applied to a gum.

Referring to the illustrated embodiment there is shown a dental plate 2, having artificial teeth 3 set therein. The dental plate comprises a body portion 4 built up over a strip 5 having a channeled shape. The strip 5 is adapted to receive a rib 6 which is held in place by flaps 7 extending divergently therefrom and engaging the gum 8.

In forming the plate, I provide a strip 5 (Figure 2) having divergent shoulders 9 shaped to conform to the gums of the user. The body portion 4 of the plate 2 is built around the strip 5 and securely engages the same.

Figure 3:
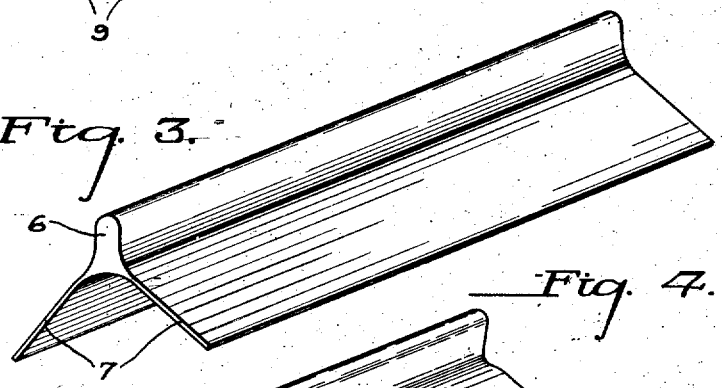
Figure 3 shows the cushion adapted to engage the gum and hold the plate in place.

Figure 3 illustrates a portion of the cushion employed, showing the rib 6 and divergent flaps 7. The flaps 7 are preferably of substantially the same thickness throughout so that the strip 5 shaped to the contour of the gums will fit closely to the cushion. That is, the flaps 7 merely raise the strip and denture a slight distance above the gums. The rib 6 is designed to fit within the strip 5, engagement between the strip and the rib being effected adjacent the lines of juncture between the rib 6 and the flaps 7.

In applying the denture, the cushioning strip of rubber is applied to the plate and the rib pressed into the channel, the rib and the flaps being manipulated in such manner as to expel any air which may be between the cushion and the gum. It will be noted that the channeled strip 5 is narrower at the cushion engaging portion than within its interior. This insures a relatively small sealing area between the strip and the cushion while the interior of the strip is sufficiently large to permit of any necessary compression of the rubber into the channel to compensate for irregularities and accommodate the rib 6 of the cushioning strip.

It may be desirable to have the surfaces of the flaps 7 which engage the plate slightly adhesive, especially at the ends of the cushioning strip, so as to insure effective sealing, it being especially important that the ends of the strip should be sealed in the channel. After the cushioning strip has been sealed onto the denture, the denture is ready for use. It is placed in the mouth in the usual way and the flaps 7 are pressed against the gums to expel the air between the cushion and the gums. The flaps 7 act to seal the space between the gum and the cushion against atmospheric pressure so that the cushion is firmly held in place on the gum.

The shoulders 9 on the strip 5, conforming to the contour of the gum, present a rather extended area of contact for engagement with the flaps 7. This insures that slight vacuum may be maintained within the strip 5 when the denture is in place.

I prefer to form the vacuum strip of metal so that the denture will not be weakened by reason of the channel occupied by the strip. In making the denture, a negative impression is first made of the mouth of the patient. From this negative there is made a positive model in the usual manner and which is an exact duplication of the mouth of the patient. Then the denture is built up by laying dental paper over the gum portion of the model until it is of the thickness substantially equal to the thickness of the flaps 7. The vacuum strip 5 is then laid on top of the paper and bent to the desired shape, after which the denture is built up over and around the strip. When the denture is finished, the paper is removed and the cushioning means applied, as hereinbefore described. In this way, a denture is constructed which conforms in the gum receiving cavity thereof to the contour of the patient's mouth, but with a gum receiving recess larger than the patient's gum, thus providing a space which accommodates the cushioning rubber.

I prefer to make the cushioning device of rubber because of its excellent sealing properties and flexibility. While I have found that soft rubber forms an excellent cushion and sealing device between the denture and the gum, it will be understood that other compositions may be used without departing from the invention.

Figure 2:
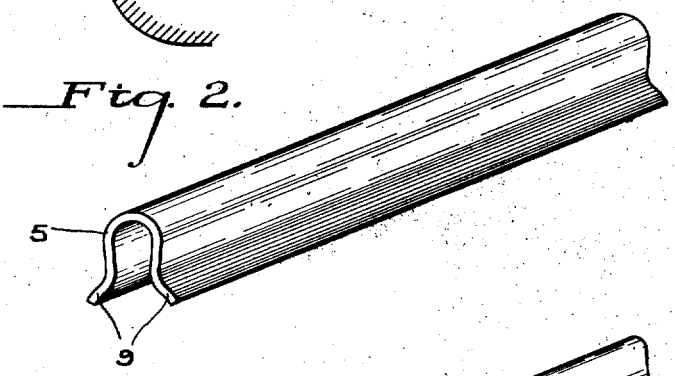
Figure 2 illustrates the vacuum strip employed in the plate.

It will be understood that the showing in Figures 2 and 3 of the vacuum strip and cushion, respectively, is that of the straight material before it has been shaped to conform to the denture.

Figure 4:
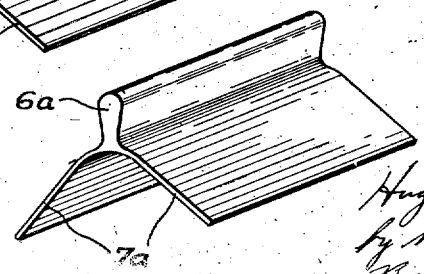
Figure 4 is a view similar to Figure 3 of a slightly modified cushioning strip.

In Figure 4, I have illustrated a cushioning strip having a rib $6^a$ which is narrowed in at its base, and having flaps $7^a$ thereon.

While I have illustrated and described the present preferred embodiment of my invention, it will be understood that the invention is not limited thereto but may be otherwise embodied within the scope of the following claims.

I claim:

1. An artificial denture comprising a plate member having a cavity on its inner face, and a gum engaging cushion member held by suction in the cavity and adapted to be held by suction against the gum of the wearer, said gum engaging cushion member forming a lining over substantially the entire gum engaging portion of the plate.

2. An artificial denture comprising a plate having a transversely concaved inner face with a cavity along the bottom thereof, and a gum engaging element having an upstanding rib received in the cavity and having flaps at each side of the rib which line the concaved inner face of the plate.

3. An artificial denture comprising a plate member having a transversely concaved inner face adapted to engage the gum of the wearer, a soft rubber gum engaging member in the concaved inner face of the plate and forming a complete lining therefor, and a projection on the said soft rubber member extending into a cavity on the said inner face of the plate.

4. The method of making an artificial denture which comprises placing an impression means over the gum portion of a model, conforming a channeled strip to the gum over the impression means and laying it thereon, and building up a denture around and over the strip to conform with the impression.

5. For use with an artificial denture, a channeled strip having portions thereof adapted to conform generally to a gum, and a cushion adapted to be placed between the gum and the strip and straddle the gum, said cushion having a rib thereon adapted to lie within the channeled strip.

6. In the combination with an artificial denture having a gum engaging recess, a channeled strip adapted to lie within the body of the denture, a cushion in the recess adapted to support the denture on a gum, said cushion providing a lining for the recess conforming to the shape of the gum, and having a rib thereon lying within the channeled strip.

7. The combination with an artificial denture having a gum receiving recess therein, of a channeled strip in the denture, a rubber cushion in the recess adapted to support the denture on a gum, said cushion having sealing flaps adapted to line the recess and lie between the denture and the gum, and a rib extending within the channeled strip, said channeled strip having shoulders engaging the cushion whereby a subatmospheric pressure may be maintained within the channeled strip.

8. An artificial denture having a gum receiving recess therein, and a channeled strip embedded in the gum receiving recess substantially along the center of the recess, the top of the channeled strip being narrowed in, and a cushion lining covering the interior of the recess.

9. An artificial denture having a gum engaging recess therein and having a channel in the gum engaging recess thereof, a cushioning strip having a rib engaged in the channel and having flaps at each side of the rib adapted to straddle the gum of the wearer, said cushioning strip having its ends sealed into the channel and being adapted to form a complete cushion lining for the gum engaging recess.

10. An artificial denture comprising a plate member having a gum receiving recess therein to permit the member to set on the gum of the wearer, and a soft replaceable rubber liner in the recess over substantially the entire surface thereof, the bottom of the recess having a channel therein into which excess rubber in the liner may be forced.

11. The method of making an artificial denture which comprises placing a flexible material over the entire gum portion of a model, building up a plate and denture over the impression means whereby the resulting denture will have a gum receiving recess larger than the gum portion of the model by a thickness equal to the thickness of the impression means, removing the impression means from the denture and substituting a lining of rubber therefor, said rubber lining covering the entire gum-engaging area of the denture.

12. The method of making an artificial denture which comprises making an impression from the mouth of the patient, forming a positive model from this impression, laying a thickness of pliable material over the gum portion of the model thus produced, building up a denture around and over the pliable material, the pliable material intervening between the denture and the gum portion of the model, thereafter removing the pliable material to form a denture which has a gum receiving recess conforming to the shape of the model but larger than the model by an amount equal to the thickness of the pliable material, and thereafter lining the entire area of the gum receiving recess of the denture with a thickness of soft cushioning rubber, the oversize of the recess compensating for the thickness of a rubber lining.

In testimony whereof I have hereunto set my hand.

HUGH D. MORGAN.